(12) United States Patent
Salvi et al.

(10) Patent No.: US 9,275,495 B2
(45) Date of Patent: Mar. 1, 2016

(54) RENDERING TRANSPARENT PRIMITIVES

(75) Inventors: Marco Salvi, San Francisco, CA (US); Jefferson D. Montgomery, Victoria (CA); Aaron Lefohn, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 13/117,698

(22) Filed: May 27, 2011

(65) Prior Publication Data

US 2012/0299951 A1    Nov. 29, 2012

(51) Int. Cl.
| | |
|---|---|
| *G06T 15/50* | (2011.01) |
| *G06T 15/40* | (2011.01) |
| *G06T 15/08* | (2011.01) |
| *H04N 13/00* | (2006.01) |
| *G06T 15/00* | (2011.01) |

(52) U.S. Cl.
CPC .............. *G06T 15/503* (2013.01); *G06T 15/00* (2013.01); *G06T 15/08* (2013.01); *G06T 15/40* (2013.01); *G06T 15/405* (2013.01); *G06T 15/50* (2013.01); *H04N 13/0018* (2013.01)

(58) Field of Classification Search
USPC ......................................................... 345/592
See application file for complete search history.

(56) References Cited

U.S. PATENT DOCUMENTS

| | | | |
|---|---|---|---|
| 6,529,194 B1 * | 3/2003 | Yamaguchi | 345/426 |
| 7,233,332 B2 * | 6/2007 | Lokovic et al. | 345/426 |
| 2010/0182323 A1 * | 7/2010 | Nuydens | 345/441 |

OTHER PUBLICATIONS

Salvi, M., Vidimče, K., Lauritzen, A., & Lefohn, A. Adaptive volumetric shadow maps, Jun. 2010, Blackwell Publishing Ltd, in Computer Graphics Forum (vol. 29, No. 4, pp. 1289-1296), http://onlinelibrary.wiley.com/doi/10.1111/j.1467-8659.2010.01724.x/full.*

Ague, Jay J., and Ethan F. Baxter. "Brief thermal pulses during mountain building recorded by Sr diffusion in apatite and multicomponent diffusion in garnet." Earth and Planetary Science Letters 261.3 (2007): 500-516.*

Enderton E., Sintorn E., Shirley P., Luebke D.: Stochastic Transparency. In I3D '10: Poceedings of the 2010 Symposium on Interactive 3D Graphics and Games (Feb. 2010), pp. 157-164. 2.

Jansen J., Bavoil L.: Fourier Opacity Mapping. In I3D '10: Proceedings of the 2010 Symposium on Interactive 3D Graphics and Games (Feb. 2010), pp. 165-172. 2.

Kelley M., Gould K., Pease B., Winner S., Yen A.: Hardware Accelerated Rendering of CSG and Transparency. In SIGGRAPH '94: Proceedings of the 21st Annual Conference on Computer Graphics and Interactive Techniques (New York, NY, USA, 1994), ACM, pp. 177-184. 2.

Kim T.-Y., Neumann U.: Opacity Shadow Maps. In Rendering Techniques 2001: 12th Eurographics Workshop on Rendering (Jun. 2001), pp. 177-182, 2.

Kniss J., Premoze S., Hansen C., Shirley P. S., McPherson A.: A Model for Volume Lighting and Modeling. IEEE Transactions on Visualization and Computer Graphics 9, 2 (Apr./Jun. 2003), pp. 150-162. 2.

(Continued)

*Primary Examiner* — Mark Zimmerman
*Assistant Examiner* — Sarah Le
(74) *Attorney, Agent, or Firm* — Trop Pruner & Hu, P.C.

(57) ABSTRACT

Representing a transparent object as a summation of substantially zero step functions of a visibility curve for the object. An array may be used to store nodes to represent the visibility function. The size of the array may be limited to be storable within a memory of an on-chip graphics processing unit.

20 Claims, 3 Drawing Sheets

(56) References Cited

OTHER PUBLICATIONS

Lokovic T., Veach E.: Deep Shadow Maps. In Proceedings of ACM SIGGRAPH 2000 (Jul. 2000), Computer Graphics Proceedings, ACS, pp. 385-392. 2, 3.

Mertens T., Kautz J., Bekaert P., Van Reeth F.: A Self-Shadow Algorithm for Dynamic Hair using Density Clustering. In rendering Techniques 2004: Eurographics Symposium on Rendering (Sweden, Jun. 2004), Eurographics/ACM SIGGRAPH Symposium Proceedings, Eurographics. 2.

Salvi, M., Montgomery, J., Lefohn, A.: Adaptive Transparency, in Proceedings of the ACM SIGGRAPH Symposium on High Performance Graphics (HPG '11). pp. 119-126. 2011.

Sintorn E., Assarson U.: Hair Self Shadowing and Transparency Depth Ordering Using Occupancy Maps. In I3D '09: Proceedings of the 2009 Symposium on Interactive 3D Graphics and Games (Feb./Mar. 2009), pp. 67-74. 2.

Xie F., Tabellion E., Pearce A.: Soft Shadows by Ray Tracing Multilayer Transparent Shadow Maps. In Rendering Techniques 2007: 18th Eurographics Workshop on Rendering (Jun. 2007), pp. 265-276. 2.

Yuksel C., Keyser J.: Deep Opacity Maps. Computer Graphics Forum 27, 2 (Apr. 2008), pp. 675-680. 2.

Zhou K., Hou Q., Gong M., Snyder J., Guo B., Shum H.-Y.: Fogshop: Real-Time Design and Rendering of Inhomogeneous, Single-Scattering Media. In Proceedings of Pacific Graphics 2007 (Nov. 2007), pp. 116-125. 2.

Zhou K., Ren Z., Lin S., Bao H., Guo B., Shum H.-Y.: Real-Time Smoke Rendering Using Compensated Ray Marching. In SIGGRAPH '08: ACM SIGGRAPH 2008 papers (New York, NY, USA, 2008), ACM, pp. 1-12. 2.

* cited by examiner

RENDERING TRANSPARENT PRIMITIVES

BACKGROUND

This relates generally to graphics processing and particularly to techniques for rendering transparent images.

Graphics processing continues to address the problem of rendering transparent objects in real-time. Renderers determine the amount of light transmitted by all objects between a given fragment and the viewer. Ray tracers compute this quantity as a result of tracing rays from the viewing position into the scene. However, rasterizers generate fragments in any order, collect transmittance information from each fragment and use it to determine the final pixel color after all partial occlusions are determined. There are a number of exact and approximate methods for handling transparency in the rasterizer.

If a fragment is at a distance $z_i$ from the viewer, has color $c_i$ and transmittance $1-\alpha_i$, and $vis(z)$ represents a transmittance between the fragment in the viewer, this contribution is given by:

$$c_i \alpha_i vis(z_i) \tag{1}$$

with the total contribution of many overlapping fragments given by:

$$\Sigma_{i=1}^{n} c_i \alpha_i vis(z_i) \tag{2}$$

While the transmittance and color of each fragment are known during the fragment shading, computing transmittance $vis(z_i)$ is the focus of rasterization transparency algorithms.

DETAILED DESCRIPTION

An adaptive transparency algorithm may be used to render transparent primitives by capturing an approximate visibility function for each pixel. In some embodiments, all fragments are first stored before compositing them. However, with graphics hardware that implements mutex-protected read-modify-write operations from fragment shaders, the algorithm may directly render the visibility representation in a fixed memory allocation. An adaptively compressed visibility representation may be stored in a fixed amount of memory, that may be efficiently constructed and sampled while rendering in some embodiments.

The visibility function $vis(z)$ carries all the information relative to the fragment depth ordering and transmittance and its properties, as described in equation 2. A general method for determining transparency is to (1) render fragments and to build the representation of visibility and (2) render fragments and composite them using equation 2.

Figure 1:
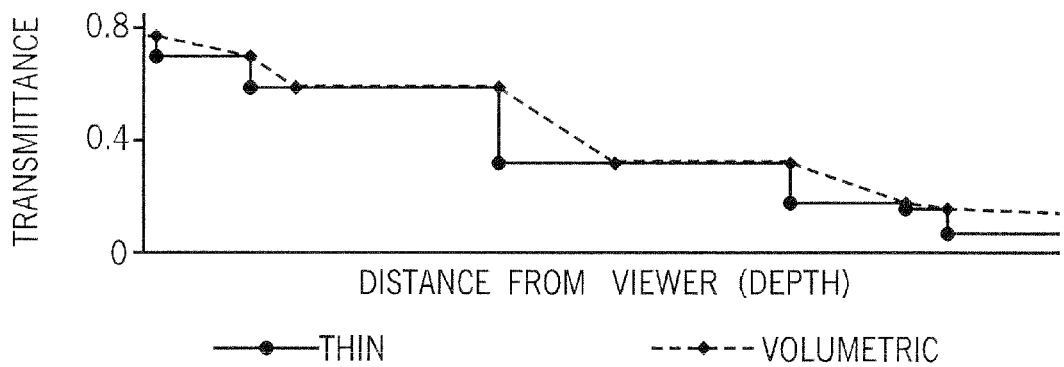
FIG. 1 is a depiction of visibility curves for thin light blockers in accordance with one embodiment of the present invention.

As shown in FIG. 1, the piecewise linear approximation of a visibility curve, assuming infinitely thin light blockers, may be represented as a collection of step functions. Specifically:

$$vis(z)\Sigma_{i=1}^{n}(1-\alpha H(z-z_i)) \tag{3}$$

where H(x) is the Heavisde step function:

$$H(x) = \begin{cases} 0 & x \le 0 \\ 1 & x > 0 \end{cases}$$

Figure 2:
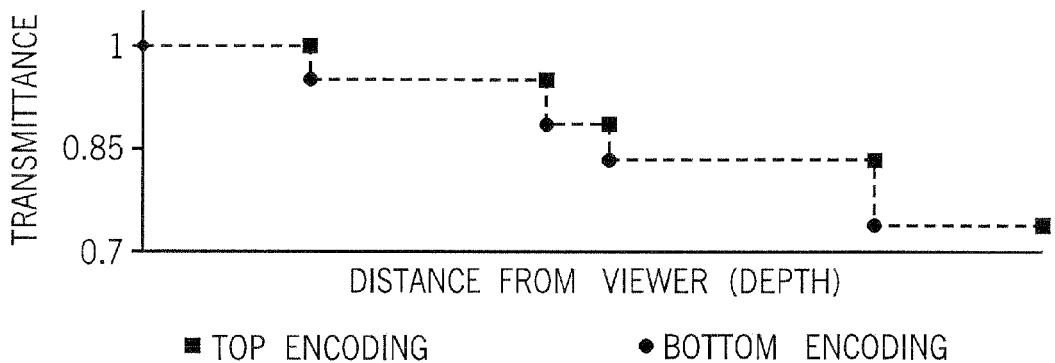
FIG. 2 is a depiction of top versus bottom node encoding in accordance with one embodiment of the present invention.

Each segment may be represented with a single node as shown in FIG. 2. Because the first node's transmittance value is always equal to one, representing no transparent fragments between the depth and the viewer, the transmittance value encoded by the next node, which is also always equal to one, is redundant. On the other hand, the third node carries valuable information. Encoding the bottom nodes of the step functions enables representation of the full visibility curve with one less node than with top encoding.

In FIG. 2, top and bottom encoding are depicted. Top encoding selects the node with a higher transmittance value, at the same depth, and bottom encoding selects the node with a lower transmittance value, at the same depth.

This visibility approximation is therefore a set of nodes containing a visibility value, ordered by depth, stored in a fixed length array. Fragments can be added in any order by inserting a new node into the array according to the fragment's distance from the camera with a visibility initially equal to the previous node. Then its visibility and the visibility of all nodes behind it are multiplied by $1-\alpha_i$.

Figure 3:
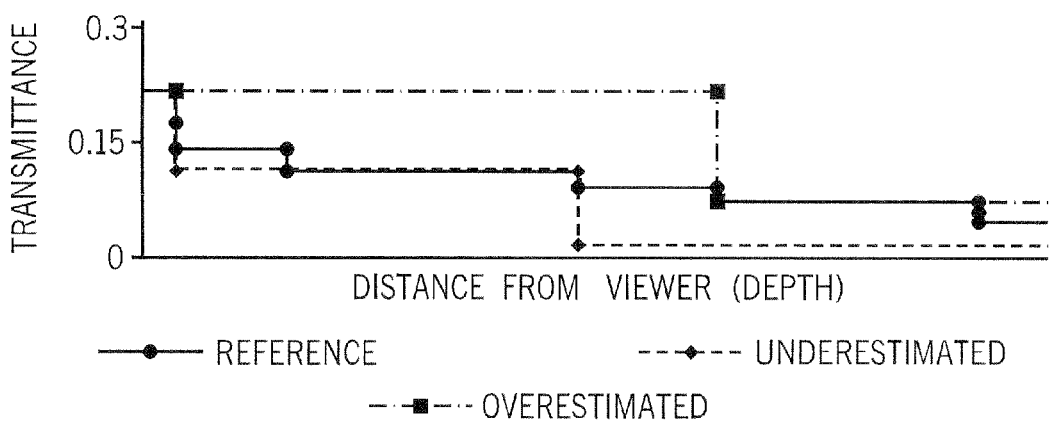
FIG. 3 is a depiction of underestimated and overestimated node compression in accordance with one embodiment.

If the array is full, then a new node insertion is followed by a compression that removes one node and brings the array back to its maximum allowed size. If we simply remove a node then, as shown in FIG. 3, the compressed visibility function is always overly transmissive. An alternative is to set the visibility of the previous node to that of the removed node, producing a less transmissive visibility approximation.

The node to be removed may be selected by minimizing the change in integral over the visibility function. Thus, the node to remove j, is given by:

$$\arg_j \min\{\min(\min(z_{j+1}-z_j, z_j-z_{j-1})(vis(z_{j-i})-vis(z_j))\}$$

where candidate nodes are chosen so as to not overrun the array.

Underestimating and overestimating compression strategies are not symmetric from an image quality standpoint. The underestimate technique generally produces less objectionable artifacts because overestimating visibility makes fragments in the compressed segment more visible. Underestimating deemphasizes them. Selecting which technique to use on a node-by-node basis produces less overall error, but may introduce higher frequency artifacts. In some embodiments the underestimating compression strategy may be used.

The piecewise constant approximation of the visibility curve may be implemented by a summation of substantially zero step functions. A step function or stepped function is a function that has different constant values on adjacent subintervals, so it has discontinuities at the ends of each interval. "Substantially zero" means that the heights of the steps are substantially zero.

To understand whether the probability of a node being picked for removal is uniformly distributed, the rate of variation of our metric with respect to distance from the camera may be analyzed, which should be constant everywhere for a truly unbiased metric. More formally, this translates to computing the second derivative of the area under the visibility curve generated by a given set of transparent fragments $(z_i, a_i)$:

$$\frac{\partial^2}{\partial z^2} \int_0^z vis(t)dt = \frac{\partial}{\partial z}\left\{\prod_{i=1}^n (1 - \alpha_i H(z - z_i))\right\}$$

$$= \frac{\partial}{\partial z}\left\{\exp\left[\sum_{i=1}^n \ln(1 - \alpha_i H(z - z_i))\right]\right\}$$

$$= vis(z)\left[\sum_{i=1}^n \left(-\frac{\alpha_i \delta(z - z_i)}{1 - \alpha_i H(z - z_i)}\right)\right]$$

Given that $a_i \in [0,1]$, the last expression is non-positive for any $z_i$ and zero everywhere else. Moreover, since vis(z) is a monotonically decreasing function, as we pick nodes further away from the viewer, the second order derivative approaches zero and consequentially $\Delta_i$ will tend to get smaller too. Therefore, our metric is naturally biased towards preserving nodes that are closer to the camera in one embodiment.

Fragments that are more distant from the viewer tend to contribute less to the final pixel color since they are more likely to be partially covered by other fragments. Hence, it is advantageous, in some embodiments, to have a more accurate reconstruction of the head of the visibility curve if the only detriment is to have less accurate approximation of the tail of the curve.

Further, when using 16 or more nodes, many scenes may benefit from an additional bias that preserves nodes closer to the camera. To avoid adding more terms to our metric, in one embodiment, we simply restrict node removal to the far half of the array. This modification also increases performance by reducing the compression phase working set.

We implement, in the DirectX 11 application program interface (API) the A-buffer transparency algorithm. This method employs two rendering passes:
1. Render transparent geometry from the camera and capture the depth, color, and transmittance of all transparent fragments in per-pixel linked lists.
2. A full screen resolve pass that sorts each pixel's linked list based on depth, and then recursively composites the list's fragments into the frame buffer using Equation 3.

The second rendering pass is a full-screen resolve that is specific to the A-buffer implementation. However, it is straightforward to replace that specific resolve with alternative transparency algorithms, each fed with the transparent fragments captured in the first pass.

The adaptive transparency (AT) algorithm replaces A-buffer's second full-screen resolve pass with a single pass with two logically distinct phases:
1. Read fragments from the per-pixel list and insert each new fragment into our adaptive visibility representation (compressing it only if necessary).
2. Iterate again over each fragment, evaluating its visibility and compositing them into the frame buffer using Equation 2.

Our algorithm need not require off-chip storage for visibility in some embodiments: the entire representation is built and consumed on chip as long as the target graphics processing unit (GPU) has enough register or cache memory.

Some embodiments of the transparency algorithm can approximate complex visibility functions with a small amount of data that is never stored off-chip, thus narrowing the ever growing gap between compute and memory bandwidth resources and providing a method likely to scale well in the future generations of graphics hardware. On the other hand, some embodiments capture all transparent fragments rendered and require a variable amount of memory proportional to the total number of transparent fragments.

Figure 4:
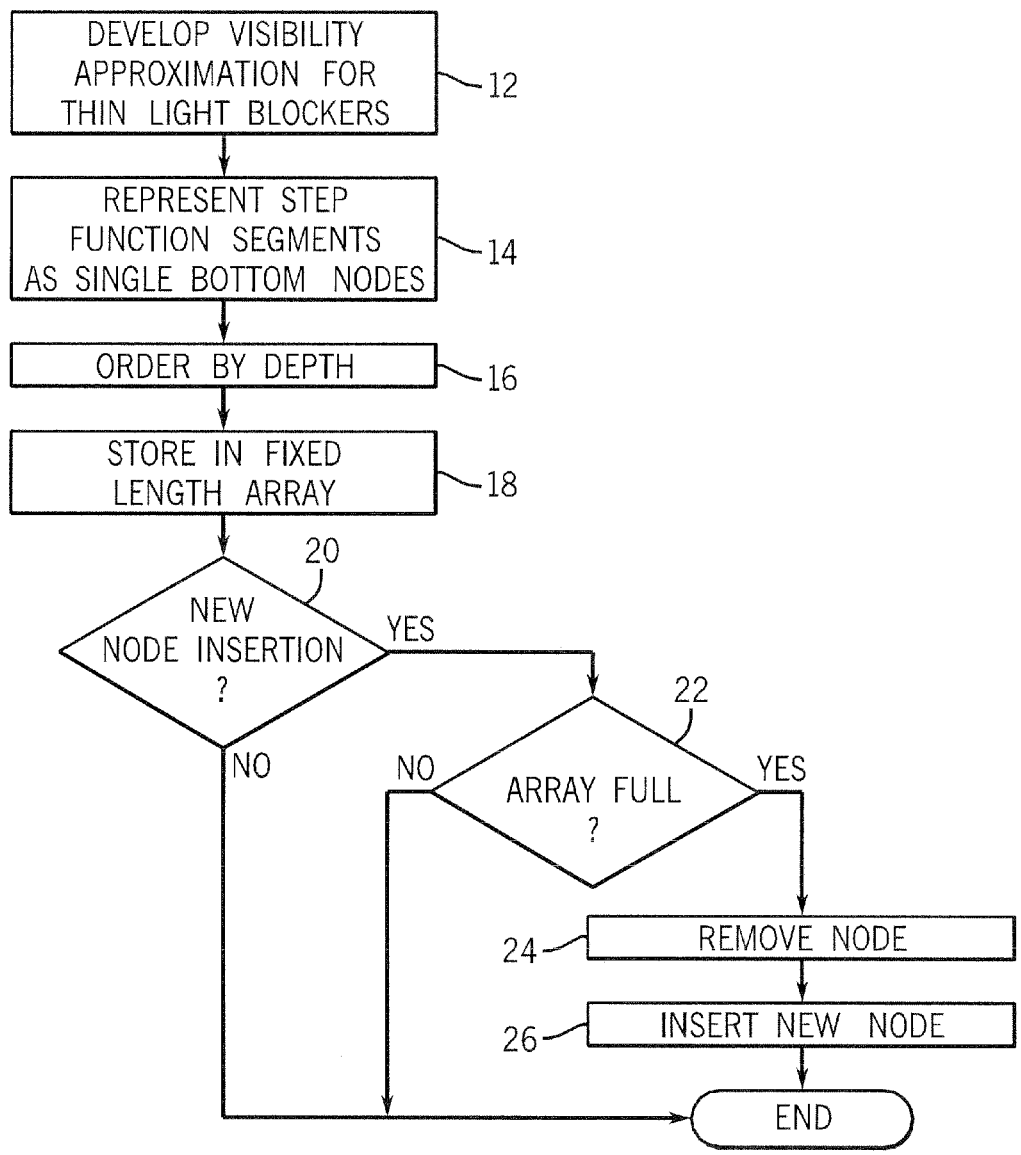
FIG. 4 is a flow chart for one embodiment of the present invention.

Referring out of FIG. 4, in accordance with some embodiments of the present invention, the adaptive transparency algorithm may be implemented in software, hardware and/or firmware. In software embodiments, it may be implemented using computer readable instructions stored on a non-transitory computer readable medium such as a magnetic, optical or semiconductor storage.

The sequence of FIG. 4 begins by developing a visibility approximation for infinitely thin light blockers as indicated in block 12. Then the step function segments are represented as single bottom nodes as indicated in block 14. Next, nodes are ordered by depth (block 16). The ordered nodes are stored in a fixed length array as indicated in block 18.

A check at diamond 20 determines whether there is a request for a new node insertion in the step function. If not, the flow ends. Otherwise, the flow proceeds to check whether the fixed length array is full or has reached its fixed length. If not, the flow ends. If the array is full then a node is removed as indicated in block 24 and a new node is inserted as indicated in block 26.

In a second implementation compressed visibility functions are built in a streaming fashion, avoiding capturing and storing upfront all transparent fragments, and thus enabling implementations that use a fixed and a priori knowable amount of memory. To enable this implementation, a shader cuncurrently read-modify-writes a visibility curve with other shader invocations while avoiding data races. Presently, the APIs supported by current graphics processors do not permit per-pixel resource locks, preventing this implementation. While this limitation is likely to be lifted in future graphics application program interfaces, central processing units do not suffer from this limitation and already provide a means to implement a fixed memory version of the transparent primitives rendering method presented herein.

Figure 5:
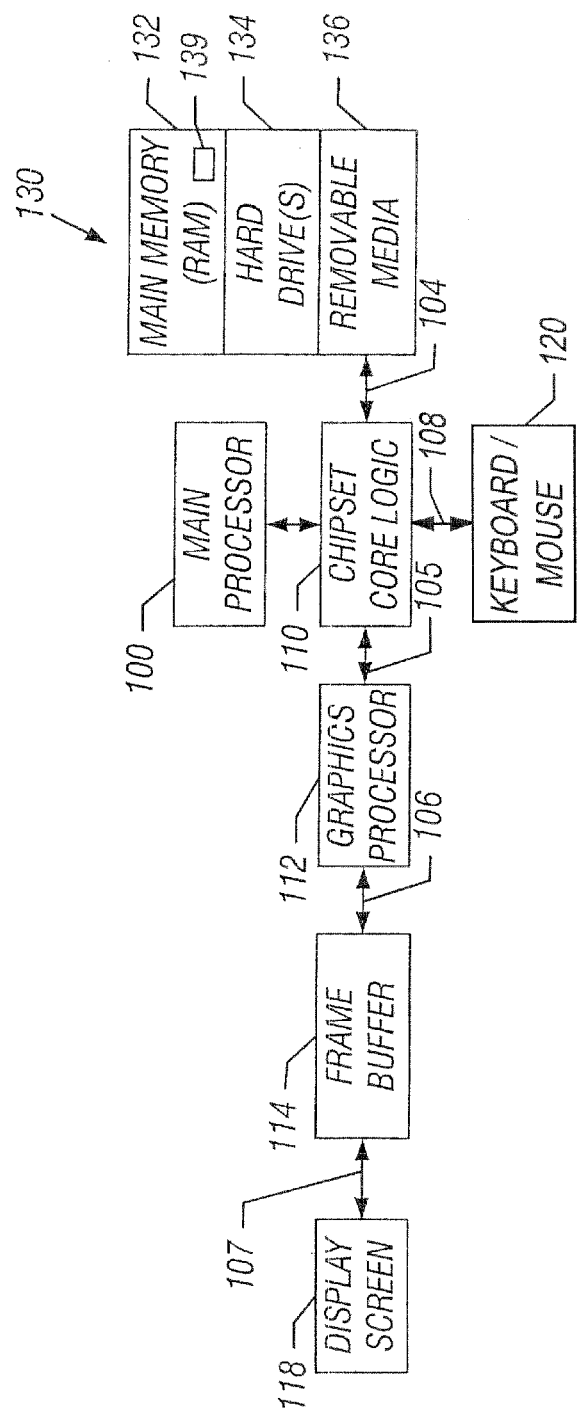
FIG. 5 is a hardware depiction for one embodiment of the present invention.

The computer system 130, shown in FIG. 5, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 4 may be stored in a non-transitory machine or computer readable medium, such as the memory 132, and/or the graphics processor 112, and/or the central processor 100 and may be executed by the processor 100 and/or the graphics processor 112 in one embodiment.

FIG. 4 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 4.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: representing a transparent object, having only two light passing surfaces, in a computer as a summation of more than two substantially zero step functions, said more than two functions of a visibility curve for the object, representative of more than one infinitely thin light blockers that do not exist physically;
   defining a plurality of substantially zero step functions within the interior of said object; and
   displaying said object using said substantially zero step functions.

2. The method of claim 1 including representing said visibility function by using step function nodes.

3. The method of claim 2 including representing said visibility function having nodes using less than all of its nodes.

4. The method of claim 3 including representing a plurality of steps of the visibility function using one node per step.

5. The method of claim 4 including representing the visibility function using only the bottom node of a plurality of steps.

6. The method of claim 5 including storing a representation of said visibility in an array whose size is limited by the capacity of a memory of a graphics processing unit.

7. The method of claim 6 including, when the array is full, removing a node before adding a new node.

8. The method of claim 7 including selecting a node to remove by minimizing the change in an integral over the visibility function.

9. A non-transitory computer readable medium storing instructions executed by a processor to:
   represent a transparent object, having only two light passing surfaces, as a summation of more than two infinitely thin step functions, said more than two functions of a visibility curve of the object, representative of more than one infinitely thin light blockers that do not exist physically;
   defining a plurality of substantially zero step functions within the interior of said object; and
   displaying said object using said substantially zero step functions.

10. The medium of claim 9 further storing instructions to represent said visibility function by using step function nodes.

11. The medium of claim 10 further storing instructions to represent said visibility function using less than all of its nodes.

12. The medium of claim 11 further storing instructions to represent a plurality of steps of the visibility function using one node per step.

13. The medium of claim 12 further storing instructions to represent the visibility function using only the bottom node of a plurality of steps.

14. The medium of claim 13 further storing instructions to store representation of said visibility function in an array whose size is limited by the capacity of a memory of a graphics processing unit.

15. The medium of claim 14 further storing instructions to remove a node before adding a new node when the array is full.

16. The medium of claim 15 further storing instructions to select a node to remove by minimizing the change in integral over the visibility function.

17. An apparatus comprising: a memory; and
   a processor coupled to said memory to represent a transparent object, having only two light passing surfaces, as a summation of more than two infinitely thin step functions of a visibility curve for the object, representative of more than one infinitely thin light blockers that do not exist physically, define a plurality of substantially zero step functions within the interior of said object, and display said object using said substantially zero step functions.

18. The apparatus of claim 17 wherein said apparatus is a graphics processing unit.

19. The apparatus of claim 18 wherein said memory is a memory on said graphics processing unit.

20. The apparatus of claim 19 wherein the representation of said visibility curve is stored in an array the size is limited by the capacity of said memory.

* * * * *